(12) United States Patent
Bevoor et al.

(10) Patent No.: US 9,563,282 B2
(45) Date of Patent: Feb. 7, 2017

(54) BRAHMI PHONEMICS BASED KEYBOARD FOR PROVIDING TEXTUAL INPUTS IN INDIAN LANGUAGES

(71) Applicants: Venkatakrishna Venkatesh Bevoor, Sarasota, FL (US); Guru Prasad, Oviedo, FL (US)

(72) Inventors: Venkatakrishna Venkatesh Bevoor, Sarasota, FL (US); Guru Prasad, Oviedo, FL (US)

( * ) Notice: Subject to any disclaimer, the term of this patent is extended or adjusted under 35 U.S.C. 154(b) by 138 days.

(21) Appl. No.: 14/583,033

(22) Filed: Dec. 24, 2014

(65) Prior Publication Data

US 2015/0185868 A1    Jul. 2, 2015

Related U.S. Application Data

(60) Provisional application No. 61/964,254, filed on Dec. 30, 2013.

(51) Int. Cl.
*G06F 3/023* (2006.01)
*G06F 3/01* (2006.01)

(52) U.S. Cl.
CPC ............ *G06F 3/0234* (2013.01); *G06F 3/018* (2013.01)

(58) Field of Classification Search
None
See application file for complete search history.

(56) References Cited

U.S. PATENT DOCUMENTS

| 5,528,235 | A | * | 6/1996 | Lin | G06F 3/0234 200/343 |
| 6,320,942 | B1 | * | 11/2001 | Chang | G06F 3/0233 379/93.17 |
| 6,377,685 | B1 | * | 4/2002 | Krishnan | G06F 3/0202 379/368 |
| 6,931,125 | B2 | * | 8/2005 | Smallwood | G06F 3/0234 379/368 |
| 2003/0119551 | A1 | * | 6/2003 | Laukkanen | G06F 3/0236 455/556.1 |
| 2003/0195741 | A1 | * | 10/2003 | Mani | G06F 17/2863 704/8 |

* cited by examiner

*Primary Examiner* — Chad Dicke
(74) *Attorney, Agent, or Firm* — Barry Choobin; Patent 360 LLC (57) ABSTRACT

A Brahmi phonemics based keyboard that enables user to provide textual inputs in any of the Indian Languages has been envisaged. The keyboard can be incorporated into any computer based system capable of handling Unicode compliant inputs. The layout of the keyboard includes a plurality of input keys corresponding to the characters of an Indian language, and the input keys, especially the character input keys are grouped into a plurality of clusters. The keyboard acts as a multimodal device by enabling a user to provide textual input in a plurality of Indian languages. The layout of the keyboard includes diacritic markers, formatting commands, numeric keys and functional keys being grouped into different clusters for ease of accessibility.

6 Claims, 11 Drawing Sheets

BRAHMI PHONEMICS BASED KEYBOARD FOR PROVIDING TEXTUAL INPUTS IN INDIAN LANGUAGES

CROSS REFERENCE TO RELATED APPLICATIONS

This patent application claims the priority of the U.S. Provisional Patent Application No. 61/964,254 filed on Dec. 30, 2013, having the title "Brahmi derived common phonemic Unicode generator keyboard layout for languages of India (LOI)", and the content of which is incorporated herein by reference in its entirely.

BACKGROUND

Technical Field

The present disclosure relates to the field of input devices. Particularly, the present disclosure relates to electronic input devices. More particularly, the present disclosure relates to the field of multilingual keyboards that provide Unicode compliant instructions. Still more particularly, the present disclosure relates to the field of non roman, Asian languages complaint keyboards.

Description of Related Art

Keyboard is an input device having a plurality of keys performing predetermined functions. The keys are arranged in a layout so as to be user-friendly. A keyboard is also described to be the Human Machine Interface (HMI) device, as a portable supplemental keyboard, as a device which functions as an interface point through which the human language input is passed on to the operating system and applications of a computer. A Keyboard layout includes a mapping of human language-elements in an organized format so as to enable facilitation of human language input. For example: QWERTY, Dvorak are specific named types of PC-Keyboard layouts which enable roman alphabet characters to be input tor processing and generate output that is ASCII/Unicode compliant.

Human Language-elements cover the following: Text character and their conjuncts (the visual shape of sound, the language script elements), numerals, arithmetic operators, punctuation, tonal modifier like diacritics, formatting symbols, special symbols, and the like which may be language specific (such as religious symbols, cultural shapes-outlines and signs). The language-elements of Languages of India (LOI) have multiple structural and processing commonalities, even though the script of characters do have distinct individual shapes and conjoining contour behaviors. The official keyboard layout for languages of India is approved in the standard ISCII-91/IS 13194: 1991. ISCII is the short form for Indian standard code for information interchange. Inscript, the short name for Indian Scripts, is the name for the keyboard layout.

Keyboard models other than the 'Inscript' of keyboard layouts, for example, 'Baraha' needs a software installation, and custom fonts. Certain other software such as 'Webdunia', 'Taalapatram', 'Nudi', 'Bhasha' work with the limitations of Browser plug-in, using an internal software key mapping. Certain software's such as 'Srilipi', 'I-leap', 'GIST card', use special hardware keyboards, dangle locks, locking of standard keyboards by use of a lock-key (Scroll lock or num lock/caps lock) and custom layouts to achieve the end result, i.e., providing an Indian language keypad layout. Certain software keyboards use the online softscreen and transliteration models such as 'Google' transliteration working within the Browser. Certain other software's such I-translator (Omkarananda) which uses again key maps by transliteration on English PC keyboard layout.

The scripts of languages of India are covered under the scope of two major standards: ISCII and Unicode. Thus, each character of languages of India, as rendered visually, can be linked to one unique Unicode value/Unicode sequence value/link to ISCII. The prior art InScript layout uses the design philosophy of positioning 'LOI language elements' in a secondary way in relation to the roman alphabet/English language-elements. This is the overlay approach where LOI phonemes are mapped to the proximate phonemic value of English alphabets. Further, the prior art Inscript layout involves designing the LOI-Keyboard layout within the constraints of a keyboard-layout primarily designed for Roman alphabet character usage environment. This is reflected in the QWERTY-Overlay design for LOI and upper ASCII anchored LOI code positioning, of the Inscript keyboard layout. The ASCII Standard is primarily bound to Roman alphabet character centric approach and is not adequate to meet the needs of Non-roman script languages/LOI.

Another prior art solution was to use of the alphanumeric keypad mapped multiple tapping on the same key to generate scripted characters and numerals/symbols in languages of India. This is deployed in mobile devices, where in there are several operational constraints and the volume of document is miniscule compared to the volume of texts to be handled in other routine work-environments. This is still a cumbersome process limited to the small volume text messaging services on the mobiles. With the advancements in computer technology, the reach of computers has extended to several large segments of social, economic, governmental, judiciary and executive, media and archives, educational and national work environments. As a result, the density of non-technical users of computers has increased multifold over the technical programmers. Several of the functions that have been integrally anchored on the QWERTY keyboard, keeping the needs of the programming community and English speaking society were not of any practical use for this new group of users. Contra, new user-friendly, culturally and linguistically appropriate language interface on the keyboard has become a critical desirable functionality. This scenario has ushered in the demand for development of a 'different, native user friendly, method for inputting of language visuals-symbols in to digital devices.

The available devices for inputting the languages of India on to digital devices are still being designed and delivered by making an overlay of the 'Indian language characters' on the standard 'QWERTY' layout design. Even though many modifications and upgrades/embellishing application oriented expansions have been made available for the keyboards, thereby raising the density of keys from early 84 to current 122 on the keyboards, the QWERTY area and upper-ASCII code dependency models have not been modified. These aforementioned modifications have not made any impact on the method of inputting Indian language characters in to digital devices' which is linguistically and culturally appropriate, user friendly and contemporary. There has been a several fold increase in the user population seeking a solution for inputting languages of India in to digital devices, applications like mail, banking and browsing. This summarizes the need to seek a new model of keyboard device for inputting script and phonemic elements of languages of India for processing in digital devices.

Provided herein below is a comparison between the features of languages of India (LOI) and Roman alphabet character set. With reference to the 'total number of characters', the LOI character set varies from 49 to 64, whereas the Roman alphabet character set count is 52. Further, the LOI character set includes 36 vowels and 33 consonants whereas the Roman alphabet character set includes 5 vowels and 21 consonants. Further, the scripting feature in case of LOI is agglutinating in nature, i.e., a single final visual unit represents unique conjoined phonemes and accent modifiers, whereas in case of Roman alphabet character set, the scripting feature is non-agglutinating, i.e., multiple characters are required to represent the conjoined phonemes. Further, the characters corresponding to LOI are written using a variety of schema, i.e., Devanagari models hang from the top line whereas south Indian languages have curling rolling glyphs and conjuncts going all round the shape-body of primary character. But in contrary, the characters of the Roman character set are written in a similar manner across the corresponding languages. Further, in case of characters corresponding to LOI, in a given Indian language, a symbol carries the same phonemic value irrespective of its position in the word and context. The total word needs to be learnt in one single way and represented in only that way, whereas, in case of Roman character set, a character carries different phonemic values depending on the position where it occurs, the context, the language convention related to silent letters, the surrounding characters and the language factor. The total word needs to be learnt In two modes: Scripted spelling mode for writing accuracy and pronunciation mode—for speaking a proper language. The systems and methods proposed by the below mentioned patent: documents also aim to simplify the process of proving character inputs via a HMI.

US Patent Application Publication No. 20090179780 describes a hand held thumb touch type-able ASCII/UNICODE keyboard that has an alphanumeric keypad having multiple quad keys and multiple dual keys, and a navigation keypad having multiple dual keys and single-function keys. Each corner of the dual keys of the alphanumeric keypad allows a user to type separate characters. In addition, a homing key is located at the center of the alphanumeric keypad. The goal is to provide capability of typing all the ASCII characters through a hand-held mobile device.

U.S. Pat. No. 5,660,488 describes an ergonomically condensed QWERTY reduced size keyboard having a QWERTY-keyboard layout that allows maintenance of the same typing speed and accuracy associated with conventional keyboards. U.S. Pat. No. 7,420,543 describes another model of layout on QWERTY Keyboard for making input of characters of LOI.

U.S. Pat. No. 6,231,252 describes a downsized keyboard for use with the Japanese language. One vowel is assigned to each key of a first key group. Two consonants are assigned to each key in a second key group. An unvoiced consonant is input with a single key-pressing operation while a voiced consonant is input with a double key-pressing operation.

U.S. Pat. No. 6,275,216 describes a keyboard for entering characters tor the Japanese language. One embodiment of the keyboard executes inputting of a character by zero, one, or a plurality of strokes of a code key and sequential stroke of a separator key for selecting a letter.

U.S. Pat. No. 6,281,884 describes a user-definable keyboard apparatus for use with the Chinese language. A key may correspond to one or more Chinese characters and a character may be assigned to one or more keys. The apparatus may automatically verify that a user-defined keyboard is rational by reference to a character sound grouping rules table.

U.S. Pat. No. 6,053,647 describes a "user-friendly and efficient keyboard" for the English language. The keyboard layout places punctuation marks in the center of the keyboard with letters arranged alphabetically on either side of the punctuation marks. U.S. Pat. No. 5,945,928 describes a keyboard for the Korean Language. Keys on a keyboard are assigned a plurality of characters. A word processor software analyzes key sequences to resolve ambiguities and determine which characters are intended.

U.S. Pat. No. 5,999,950 describes an on-screen keyboard for the Japanese language. An array of Japanese based Kana characters are displayed. The first selection of a character key causes the display of the character in base kana form. The second consecutive selection of the same key causes the display of the character in a variant form Subsequent consecutive selections cause the display of the character in further variant forms.

U.S. Pat. No. 207,559 is for the Standard QWERTY-PC layout. This is to be accommodated in any multilingual keyboard, for working with the standard functions of the computer keyboards for data formatting and useful compilations.

Hence there is a need to develop a Brahmi derived common phonemic Unicode generator keyboard layout for languages of India (LOI). Further there is a need to develop a keyboard layout that enables a user to input the characters in a plurality of Indian languages. Still further there is a need to develop a keyboard layout that is extended to other languages of the world, without compromising the input model for the LOI language elements.

The above mentioned shortcomings, disadvantages and problems are addressed herein and which will be understood by reading and studying the following specification.

OBJECTIVES OF THE EMBODIMENTS

An object of the present disclosure is to provide a keyboard layout that enables a user to input the characters in a plurality of Indian languages.

Yet another object of the present disclosure is to provide a keyboard layout that provides for overlaying one language element over another language element in designing a multilingual keyboard layout.

Still a further object of the present disclosure is to provide a keyboard layout that provides for primary and accommodative overlaying of Brahmi phonemics with English phonetics.

Yet another object of the present disclosure is to provide a keyboard layout that provides for an improved solution that enables users to provide inputs in a plurality of Indian Languages, with ease.

One more object of the present disclosure was to provide a keyboard layout that is user-friendly.

Another objective of the present disclosure is to provide a keyboard layout that can be extended to other languages of the world, without compromising the input model for the LOI language elements.

Yet another object of the present disclosure is to provide a keyboard that comprises a plurality of character clusters of LOI-language elements in a layout with keys in horizontal as well as vertical orientations.

Still a further object of the present disclosure is to provide a keyboard layout that has sufficient number of keys included thereupon to cover the primary character set of any Indian language.

Yet another object of the present disclosure is to provide a keyboard layout that uses multiple models of finger movement and action, thereby reducing the stress load on user's wrist, and reducing the risks of carpal tunnel syndrome in long term keyboard users.

Another object of the present disclosure is to provide a keyboard layout that can be used in any digital device that is capable of handling Unicode compliant inputs.

Yet another object of the present disclosure is to provide a keyboard layout that can be used to provide inputs in LOI across browser centric visual editors. E-mail applications, web pages, data capturing forms and databases, digital libraries and e-book readers.

One more object of the present disclosure is to provide a keyboard layout that provides for developing programming commands in non-English languages, and in particular Indian languages.

Another object of the present disclosure is to provide a keyboard layout whose functionality is not dependent upon font considerations.

The embodiment herein will become readily apparent from the following detailed description taken in conjunction with the accompanying drawings.

SUMMARY

The present disclosure envisages a custom, common phonemic, Unicode generator keyboard layout for Languages of India (LOI). The keyboard layout envisaged by the present disclosure can be positioned on a real hardware, i.e., flat, rigid, flexible/folding type or virtual keyboard, for input of scripting-elements of Languages of India (LOI) onto digital devices including but not restricted to computers, laptops and tablets.

The invention envisaged by the present disclosure provides for the character clusters of LOI-Language elements to be mapped to positions of respective keys thereby providing multiple unique positions. The keys, in accordance with the present disclosure can include spring loaded keys, coil type keys, flat top keys, and keys supported on three point-positions with a center balance. The key-layout is organized in a specific clustered way. The clusters are positioned in a matrix of vertical and horizontal layout to meet the user-mind-map of native alphabet structure-sequence in LOI. The key clusters include input key clusters, cluster(s) of formatting keys, cluster(s) of keys for selecting modes of operation, and clusters) of output keys. The key clusters are compliant with ASCII/Unicode.

The cluster layout and mapping of character-phonemic unit elements of LOI are based on the Brahmi phonemics provided in Sanskrit language. However, the keyboard layout and method may also be adapted for use with other LOI and language scripts similar to this, such as Burmese, Tatalog, Nepalese and the like. The layout can be deployed in several modes as a hardware device/HMI/soft-screen/small screen as appropriately interfaced across a multitude of operating systems and applications which are Unicode Standards compliant.

Different types of keys, varying in sizes and operational modes are used in creating the clustered layout. Different sizes-shapes and colors of the keys provide user friendliness in operation. A total of five different types of keys including push-release type keys, toggle type keys, radio type keys, LED light up type keys and rotary dial selection keys are used. These keys are zoned for specific functionalities in the keyboard layout envisaged by the present disclosure.

In accordance with the present disclosure, in a cluster marked for 'Text Elements-Character units', the keys used are two throw toggle type providing two key positions, up and down/left-right depending upon the way the key is positioned. A total of four such keys are clustered—one in vertical columnar way and three in a horizontal way; providing eight unique primary key positions in one cluster. The operational value output from keys in this zone is a Unicode/ASCII standards compliant value. This output value is decided in relation to the user choices in the zones of language selection, mode selection and diacritics. The keys may carry the visual script element for two languages—English and one of the LOI; which here for convenience is shown for Sanskrit.

In accordance with the present disclosure, the Svaras (Vowels) are grouped on the vertical layout keys. The Vyanjanas (Consonants) are grouped on the horizontal layout of keys. The consonant conjunct/Consonant-vowel combine is generated by a 'second tap' on the first key whose corresponding alphabet needs to be combined. A second tap on the home position of the consonant is interpreted by the keyboard as 'readiness of the conjunct to go in to conjunct operation', which is the equivalent of 'halant' operation in LOI terminology. The default output from consonant keys is consonant without halant. For output of halant with consonant ending, a halant modifier key is identified and the key provides for the application of the halant mark-modifier to the last input consonant. Once the consonant key receives the second tap, the keyboard is rendered ready to provide the next joining character. The conjunct readiness is also a mark of telling the system that the user input is now more than a single character; it is a 'macro-function' that needs to be handled specifically and intelligently. The same logic applies to the diacritic addition to a conjunct script. The choice of diacritic add-in option holds the conjunct character and on receipt of the user input on the value of the diacritic, the valid combination is appropriately guided for rendering.

In accordance with the present disclosure, the keyboard layout comprises 9 clusters. Each cluster maps a total of eight character units of LOI with a combination of vowels and consonants. In the QWERTY-PC compatible mode, the same keys are used to map lower case Roman alphabet letters on top row and upper case Roman alphabet letters in lower row. The numerals, symbols, and arithmetic operators are clustered separately. The display of the appropriate language specific numeral format from the specific key is linked with user selection of language option in a different zone. The text formatting—punctuation symbols—are clustered separately and in a convenient way around the text-numeral zone. The logic is while editing-formatting the data, the text entry is not done.

The user selection of language for input is made in a separate block before commencement of the text entry. The rotary switch selector uses the ISO 639 classification of languages for choice making. In another embodiment, a visual of the script of language ( as in Fonts) or the numeric selection can be made. This also allows the specific selection of a sub-dialect scripting model within a major block, even if there be a minor change in scripting convention. The mode selector block is for output regulation as ASCII or Unicode compliant. The diacritic block switch provides a two step selection: The symbol and the position where the symbol needs to be positioned. With these two user inputs the proper final rendering of the completed character goes by Unicode Standard recommendation and language appropriateness for display.

Since the phonemic commonality runs across the LOI, the change of language selection is enough to ensure the input of the same phonemic value through the same key. Thus the same key used for Hindi continues to be the key for 'Tamil/Telugu/Kannada/Guajarati/Punjabi, and the switch of language at the language select zone uniquely decides the unique Unicode value that needs to go from the key operation from the text zone.

The 'double tap/tap at the same position of consonant' to 'prepare it tor the 'conjunct operation' helps in speeding up the text keying in with the same pace and sequence of pronunciation of the word. The user knows the sequence of consonant-vowel/consonant sequence and conjunct occurrence. The tap at the same position minimizes the finger movement all over the keyboard in search of the 'halant' key and next key and then again to 'halant' for making a 'conjunct readiness'. This greatly reduces the learning curve in typing and adoption to this new keyboard layout and also the finger movements in regular typing. LOI abound in conjunct characters.

In the implementation of the keyboard layout, an intermediary intelligent processor which captures all the user inputs from the keyboard and pre-processes the final output for operating systems and applications. Such an intermediary intelligent processor device/software keyboard is visualized as an integral of the final implementation of this keyboard layout.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present disclosure are shown in some drawings and not in others, this is done only for convenience as each feature may be combined with any or all of the other features in accordance with the present disclosure.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and It is to be understood that the logical, mechanical and other changes may be made without departing from the scope of the embodiments. The following detailed description is therefore not to be taken in a limiting sense.

The present disclosure envisages a Brahmi based keyboard that enables a user to provide textual inputs in a plurality of Indian languages including but not restricted to Hindi, Marathi, Kannada, Sanskrit, Konkani, Tamil, Telugu, Gujarati, Punjabi, Oriya, Malayalam and Manipuri. Brahmi is a writing system predominantly used in the Indian sub-continent, and Central Asia. The Brahmi script acts as a foundation from which a plurality of Indian languages including but not restricted to Hindi, Marathi, Kannada, Sanskrit, Konkani, Tamil Telugu, Gujarati, Punjabi, Oriya, Malayalam and Manipuri were developed.

The keyboard (and the layout thereof) envisaged by the present disclosure can be construed as a real hardware such as a flat and rigid keyboard or flexible and folding type keyboard, or as a virtual keyboard. The keyboard envisaged by the present disclosure can be used with any digital device capable of handling the Unicode compliant input, to work with the language elements of LOI. The keyboard envisaged by the present disclosure can also be used across browser centric editors, E-mail applications, web pages, data capturing forms and databases, digital libraries and e-book readers, search engines, to provide textual inputs in any of the Indian languages. The functionality of the keyboard is not dependent upon font considerations. The only requirement is the compliance with Unicode standards. Unicode uniquely codes the script characters. Unicode allows all the combinations in all Indian languages to have a unique hex code. These hex codes may be generated by a keyboard BIOS. Externally the keyboard incorporates the same encoding vector.

The keyboard, in accordance with the present disclosure comprises a keyboard layout which in turn encompasses plurality of input keys configured to provide textual inputs in an Indian language. The plurality of keys are grouped into a plurality of predetermined clusters with each cluster comprising at least three input keys having a horizontal orientation and at least one input key having a vertical orientation. In accordance with the present disclosure, the vowels of the Indian language are provided on the input keys having the vertical orientation, and consonants of the Indian language are provided on the input keys having the horizontal orientation. Further, the consonant conjuncts are represented as a combination of a modifier key and the input keys having the horizontal orientation.

In accordance with the present disclosure, each of the input keys having the horizontal orientation are configured to interpret a second tap thereupon, as an instruction to combine the corresponding consonant with a vowel. The keyboard is configured to identify the vowel to be combined, via a keystroke provided immediately after said second tap, to one of the keys having the vertical configuration.

In accordance with the present disclosure, each of the inputs keys having the horizontal orientation are configured to interpret a second tap thereupon, as an instruction to combine the corresponding consonant with a second consonant and generate a conjunct consonant. The keyboard is configured to identify the second consonant to be combined, via a combination of keystrokes provided immediately after the second tap or a shift modifier key and one of the keys having the horizontal configuration respectively. In accordance with the present disclosure, the input keys having the vertical orientation and the input keys having the horizontal orientation are two throw toggle type keys.

In accordance with the present disclosure, the keyboard layout comprises a diacritics display block configured to display a plurality of diacritic phonemic modifiers for selection, subsequent to a consonant being input via at least one of the input keys having the horizontal orientation. The keyboard validates the consonant input by the user and the diacritic to be attached to the consonant.

In accordance with the present disclosure, the keyboard layout further includes a language selection key, configured to enable selection between English language and the plurality of Indian Languages. The language selection is made by user by a ISO code number associated with the world languages in ISO 639. The language selection key enables selection between a plurality of Indian languages.

Further, each of the input keys having the horizontal orientation comprise an input key corresponding to a soft consonant, and an input key corresponding to equivalent hard consonant. Further, each of the input keys having the vertical orientation comprise an input key corresponding to a short form vowel, and an input key corresponding to equivalent long form vowel.

Figure 1:
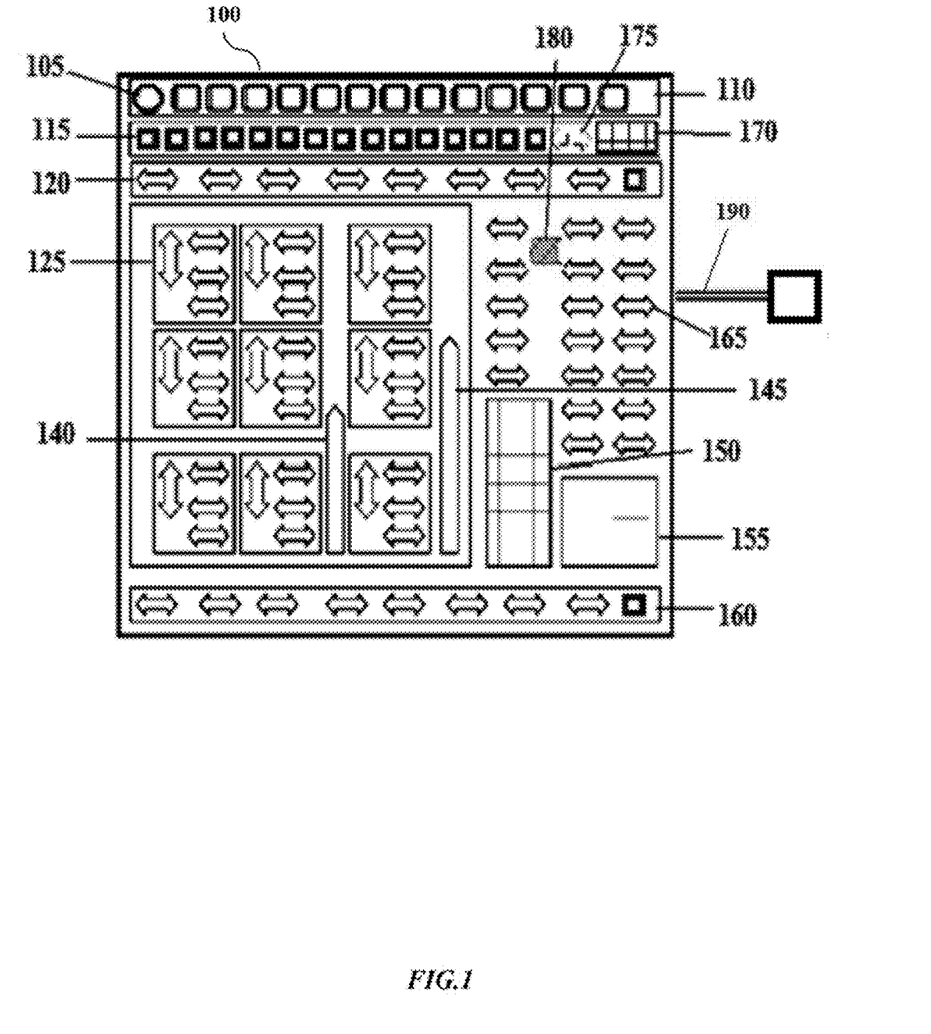
FIG. 1 is a block diagram corresponding to the layout of the Brahmi phonemics based keyboard envisaged by the present disclosure.

Referring to FIG. 1 there is shown a keyboard layout 100. Although the keyboard layout 100 can also be adapted to any Brahmi derived scripts including but not restricted to Marathi, Sanskrit, Gujarati, Punjabi, Assamese, Bengali, Oriya, Manipuri and Southern scripts Telugu, Tamil Malayalam, and Kannada. Further, Brahmi derived scripts used in languages other than Indian Languages including Sinhala, Nepali, Burmese, Tibetan, Laotian, Thai, Khmer, Javanese, Bali, Batak, Buginese and Tagalog can also be incorporated onto the keyboard layout 100.

In accordance with the present disclosure, by changing the language selection parameter, any of the languages of India can be selected right at the primary level of a single character. The toggle to QWERTY-PC mode brings up the Roman alphabet characters layout, on the keyboard layout 100.

As shown in FIG. 1, the keyboard layout 100 comprises a keyboard toggle switch 105. The set of functional keys are denoted by the reference numeral 110. The functional keys are arranged in a PC (Personal Computer) compatible format, with the sequence being 'Escape key' followed by 'F1-F2' followed by the 'Print Screen' key. The set of symbol keys are denoted by the reference numeral 115. The 'symbol keys' are also arranged in a PC compatible format.

Further, the command keys are denoted by reference numeral 120. Reference numeral 125 illustrates the clusters of the keyboard 100. Reference numeral 145 denotes the 'Enter key', and reference numeral 150 denotes the block reserved for arithmetic operators and for keys that control screen-cursor movement. Further reference numeral 175 denotes the key that enables a user to select between ASCII output and UNICODE output. Further, reference numeral 180 represents an on-board intelligent processor that screens the input provided by the user and generates an appropriate output. Reference numeral 190 denotes an HMI (Human Machine Interface)-USB connect. Further, the functionalities of the HMI-USB connect 190 can also be expanded to incorporate Bluetooth communication, and in such a case the keyboard 100 would include an ON/OFF switch for selectively activating Bluetooth Communication. The reference numeral 125 in FIG. 1 represents language cluster 01 through language cluster 09.

In accordance with the keyboard layout 100 envisaged by the present disclosure, the vowels in LOI are typically accommodated on keys having vertical orientation. The keys having the vertical orientation require an up-down rolling motion for selecting an alphabet. Further, the consonants are typically accommodated on keys having horizontal orientation. The keys having the horizontal orientation require a left-right rolling motion for selection. Certain other keys (for example, the function keys and numerical keys) are positioned in the top zone which uses the regular push-release action. In this way, the keyboard layout provides for accommodating multiple models of finger movement and action, which reduces the stress on human wrist, thereby reducing the risk of carpal tunnel syndrome in long term users of keyboard for LOI.

The grouping of input keys is such that, for consonants, the soft consonants are always on the left motion (of the input key having the horizontal orientation), and hard consonants are on the right motion (of the input key having the horizontal orientation). The keys corresponding to nasal sounds are typically located on separate keys. For the vowels, the short form is always bend forward/up portion (of the input key having the vertical orientation); and long form is always bend back/down portion (of the input key having the vertical orientation).

When the input mode of the keyboard is set for English, the top row is always lower case; and bottom row is always capital case. The recourse to the concept of using 'Shift modifier key' capital letters is not necessary in this keypad layout.

The punctuation symbols and formatting blocks for text editing are positioned separately with more frequently needed symbols close to the default hand position of the user and provide an easy access to the fingers thereof. The typical paired symbols, including open-close braces, the open-close quotation marks, angle brackets, are positioned on the same key with a rocking motion up/down-left-right access.

The use of standardized keyboard commands such as the combination of 'Control—Alt—Shift' keys is interpreted in the same way as that of a standard QWERTY PC layout. The Control-Alt-Delete keys are provided in a zone for reserved for function keys; and when these keys are used in combination as described above, the Roman alphabet character mode (to which the 'Control-Alt-Delete' combination pertains) is automatically recognized by the keyboard. When a user is starting an input operation beginning with Control-Alt-Delete keys selected, there is NO Text-Character input; and such an operation is recognized as a functional/programming command. Therefore, for the operations beginning with Control-Alt-Delete, the keyboard would recognize the respective Roman alphabet code equivalences and pass them on to the computer. For example, the copy operation represented by Control +A will be the same in the keyboard envisaged by the present disclosure, irrespective of the LOI selection. For Control+A command, the 'A' value equivalent is available in the First row-First column-vertical orientation key. For Control V command, the 'V' value equivalent is available in the bottom row—second column-vertical orientation key. The special phonemic modifiers such as Nukta are placed in a diacritical marker section. Further, with reference to FIG. 1, the 'Space Bar' 140 is an oblong key between the fourth and fifth columns. The 'Enter' key 145 is an oblong key after the sixth column and marking the end of text character input zone 125 and marking the numeral entry zone 150.

Figure 2:
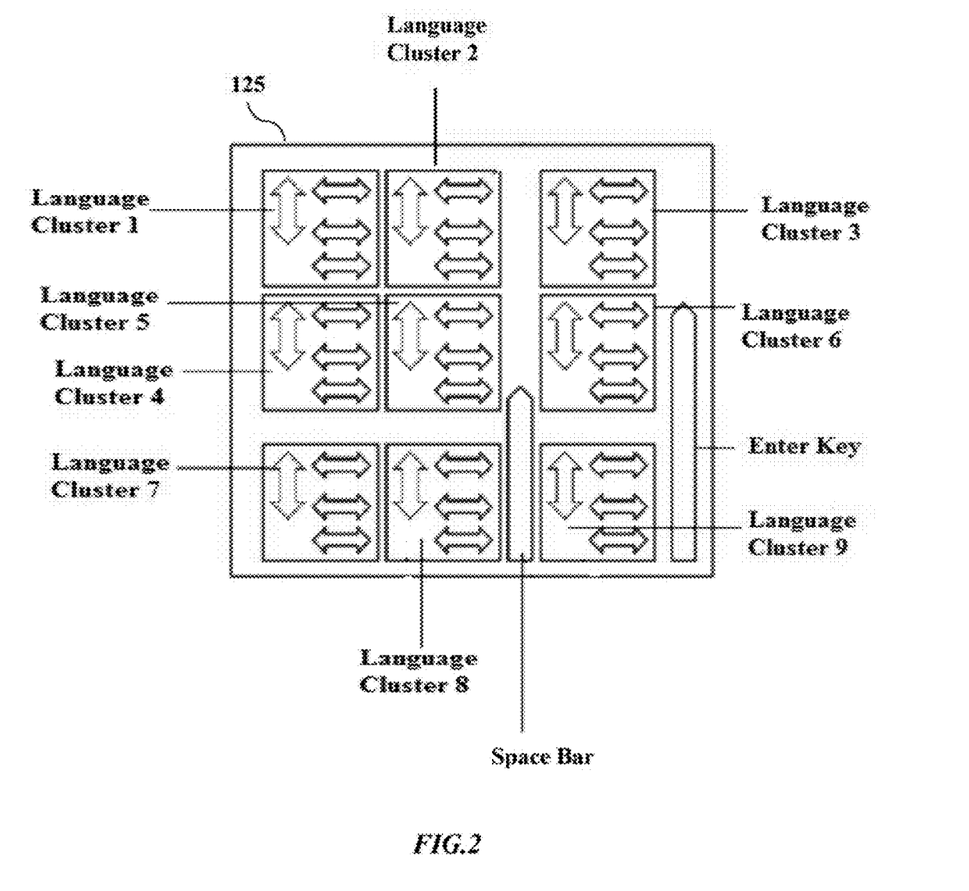
FIG. 2 is a block diagram illustrating the number of clusters present in the keyboard layout envisaged by the present disclosure.

Referring to FIG. 2, there is shown a keyboard layout 100 in accordance with the present disclosure. The keyboard layout 100 includes a total of 'nine' clusters (Language cluster 01-Language Cluster 09). Each of the language clusters incorporates four input keys, i.e., three input keys having a horizontal orientation and one input key having a vertical orientation. Typically, each of the keys having horizontal orientation incorporates at least 'two' consonants and each of the keys having vertical orientation also incorporate at least 'two' vowels. Therefore, each of the 'nine' clusters includes 'eight' input keys representing 'six' consonants and 'two' vowels. However, in certain optional implementations of the keyboard layout 100, one of the keys having the horizontal orientation can also include a 'shift modifier key'.

Figure 3:
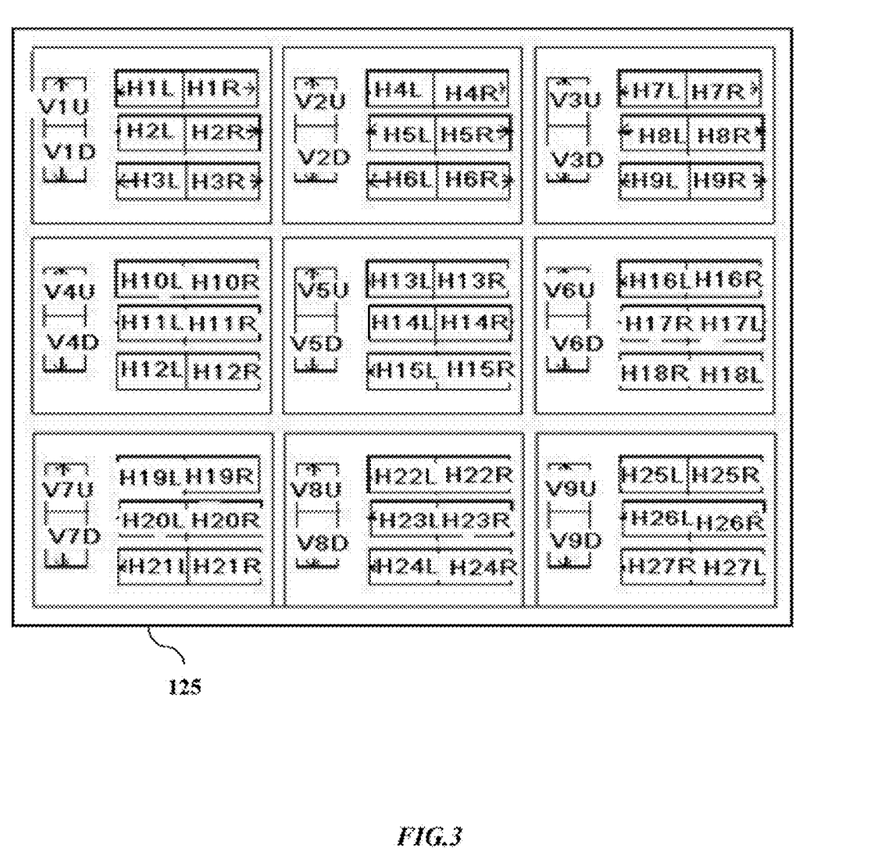
FIG. 3 is a block diagram illustrating the arrangement of the character input zone of the keyboard illustrated in FIG. 1.

Referring to FIG. 3, there is shown a detailed view of the cluster zone 125 along with the plan for laying out the input keys on each of the clusters. Further, FIG. 3 also illustrates the layout/orientation, of each of the input keys. In FIG. 3, the alphabet 'V' denotes vertical orientation and alphabet 'H' denotes horizontal orientation. The alphabet 'L' stands for 'Left' and the alphabet 'R' stands for 'Right'. FIG. 3 shows a cluster based alignment of 9 input keys having vertical orientation and 27 input keys having horizontal orientation.

Figure 4:
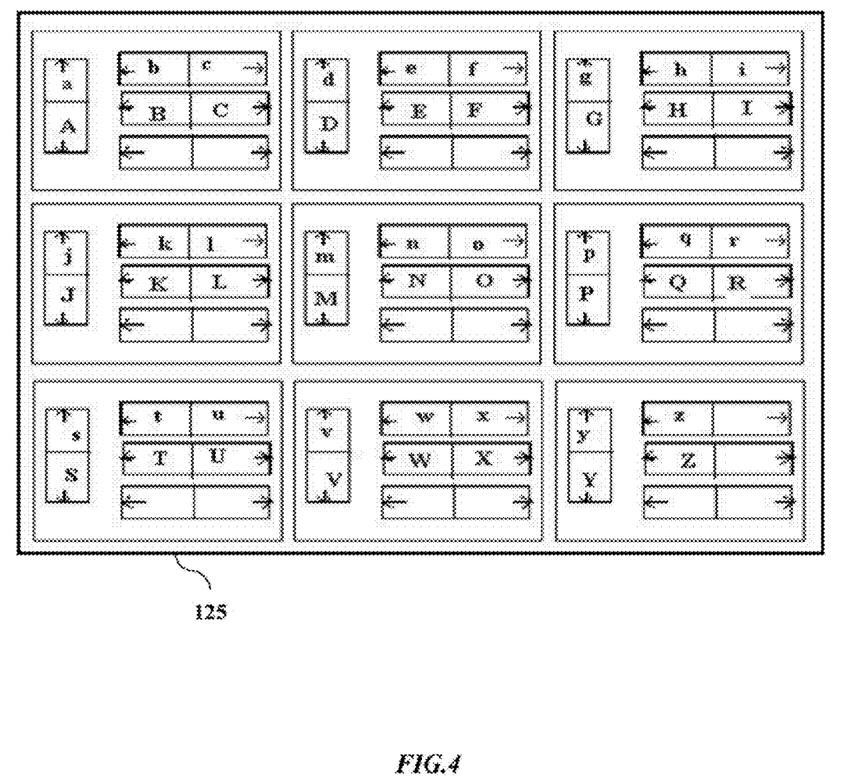
FIG. 4 is a block diagram illustrating the layout of the character input keys arranged for providing textual inputs in English language.

Referring to FIG. 4, there is shown a view of the ABCD layout showing the mapping of roman alphabet set in the clusters for text character input zone 125. The key reading linking is as follows: reading from FIG. 3, V1U is mapped to Roman alphabet character lower case 'a' represented by Unicode value <0020>; V1D is mapped to Roman alphabet character upper case 'A' represented by Unicode value <0041>. The keys left blank are reserved for future expansion and use.

Figure 5:
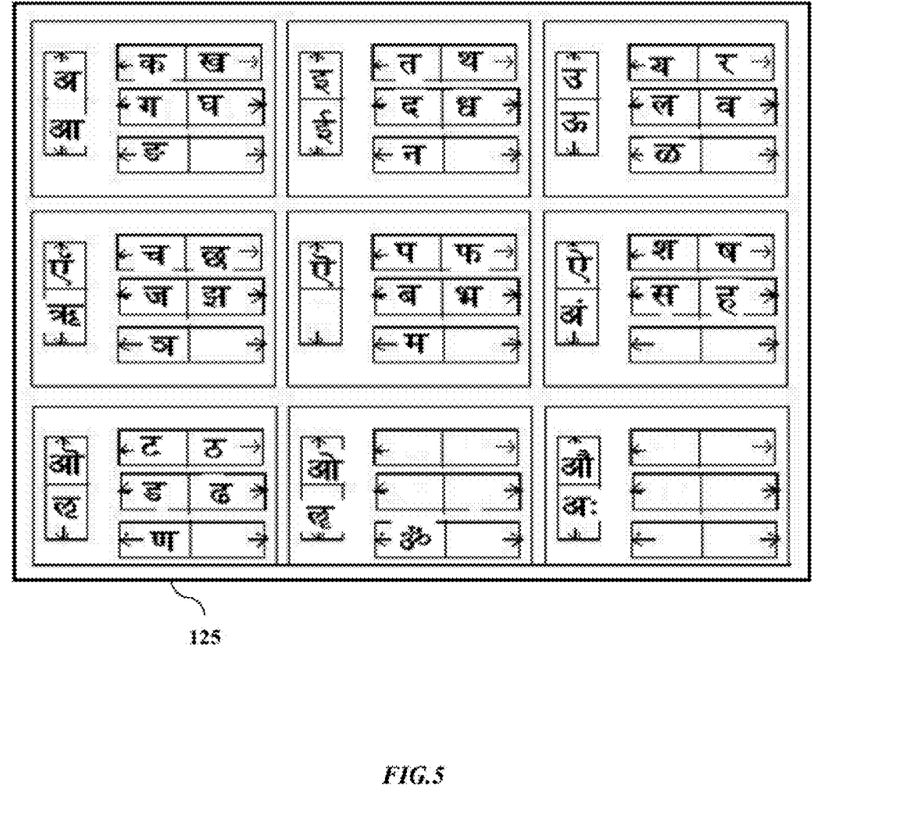
FIG. 5 is a block diagram illustrating the layout of the character input keys arranged for providing textual inputs in Hindi language.

Referring to FIG. 5, there is shown a block diagram corresponding to the layout of Devanagari script based input key positions in the text character input zone 125. Reading from FIG. 3, V1U is mapped to Devanagari Sanskrit alphabet lower case अ represented by Unicode value <0905>. Further, H1L, is mapped to Devanagari Sanskrit alphabet lower case क represented by Unicode value <0915>. Further, H1R is mapped to Devanagari Sanskrit alphabet upper case ख represented by Unicode value <0916>. The keys left blank are reserved for future expansion and use.

Figure 6:
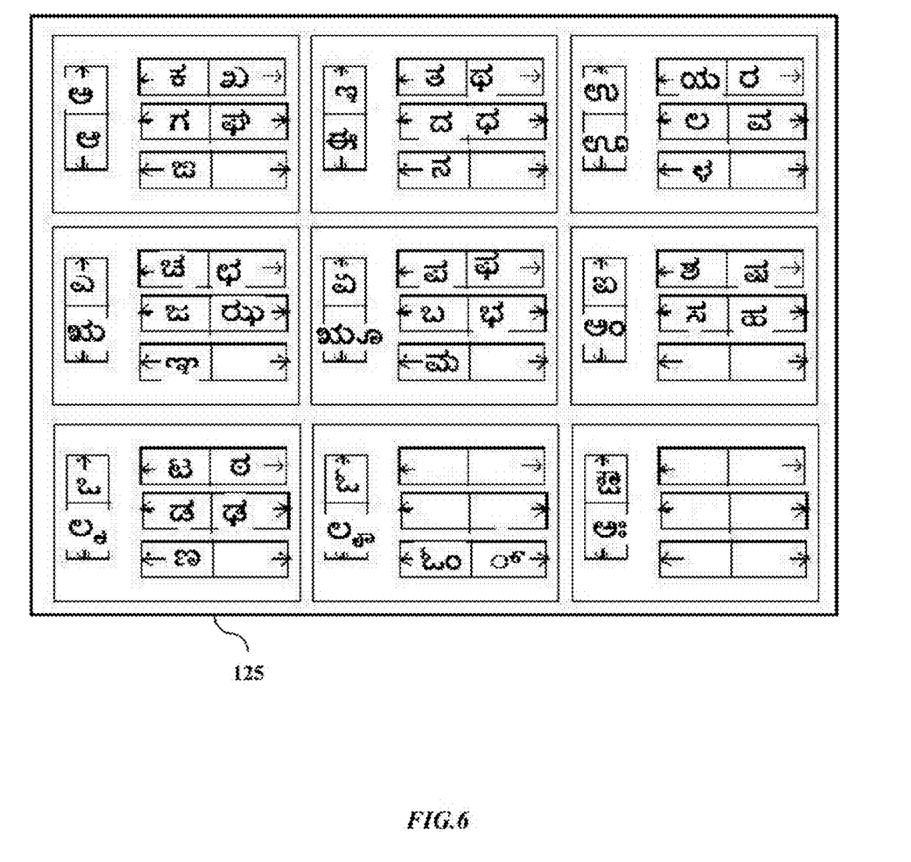
FIG. 6 is a block diagram illustrating the layout of the character input keys arranged for providing textual inputs in Kannada language.

Referring to FIG. 6, there is shown a bock diagram corresponding to the layout of key positions in the text character input zone 125, wherein the characters corresponding to Kannada script are positioned across the text character input zone 125. Reading from FIG. 3, V1U—is mapped to kannada alphabet character lower case ಅ represented by Unicode value <0C85>; V1D is mapped to kannada alphabet character upper case ಆ represented by Unicode value <0C86>. From FIG. 3, H1L is mapped to kannada alphabet character lower case ಕ represented by Unicode value <0C95>; H1R is mapped to kannada alphabet character upper case ಖ represented by Unicode value <0C96>. The keys left blank are reserved for future expansion and use.

The keyboard 100 envisaged by the present disclosure facilitates seamless typing of text in any of the languages of India. In accordance with the present disclosure, the keyboard 100 incorporates a 'second-tap' mode. The 'second tap' facilitates finger movement on input keys, in a manner as same as that corresponding to mind-memory-map of sequential sounds of conjuncts and vowels. The 'second-tap' mode obviates the need to search for a conjoining character and intermediary 'halant' character. The keyboard 100 envisaged by the present disclosure helps overcome the limitation in inputting the LOI data in QWERTY-overlay LOI layout.

It will be apparent to one skilled in the art of language scripting that the phonemic element of language and numeral symbols do not necessarily need to be combined in a keyboard layout. The keyboard should be able to recognize the intent of the user to 'go for conjunct operation' and based on the intent to input a conjunct character, the keyboard should bring together the previous character and the next character, process them in a validated way to deliver the right Unicode value and guide the render of the visual form of phoneme. In order to achieve this goal, the keyboard layout envisaged by the present disclosure segregates the input elements by groups of text, numerals, other symbols, formatting elements and diacritics, and provides a user friendly and unambiguous layout.

The diacritics are phoneme modifiers and can technically be termed as symbols. The shape and the number of diacritics in each language, and their behavior in getting engaged with the main character is a complex phenomenon. In LOI convention, the diacritics are not a main part of the normal usage; but critical inputs in advanced text editing. The language appropriate diacritics are stored and displayed in a separate block, out of the main character input zone. After the main character input, when the user decides to mark a diacritic phonemic modifier, the choice of diacritic is recognized by the keyboard and final out put waits. The validation of user input—diacritic marker combination to the character is done by the intermediary language. This is the advantage of moving all the diacritic symbols to a separate block away from the main character block, positioned as a scrolling screen, user selectable for the shape and position in relation to the main character.

The model of 'guest-accommodating the roman alphabet characters' together with the primary layout of LOI character units, envisaged by the present disclosure is also extendable to other languages of the world, without compromising the input model for the LOI language elements. For example, the French, the Spanish layout can be positioned on the Roman alphabet character slots and an LOI-Non English European language keyboard layout can be programmed.

In accordance with the present disclosure, the keyboard 100 may include an on-board software program which could be used to capture the input sequence provided by the user, and generate the final output of Unicode sequence thereby rendering a linguistically and culturally appropriate visual shape of to the characters input by the user. The equivalents of visual character shapes and phonemic voice codes for all valid key combinations can be stored in a software based library which could be linked to the software program to facilitate solutions such as Text-to-Speech and Speech-to-Text. This could be done in real time or at the end of the input sequence.

The numerals are provided in the default Indian/Arabic type due to international acceptance and porting across the plurality of languages. Numeric keys are provided to get the (numeric) output in the user-chosen LOI for the text entry.

Figure 7:
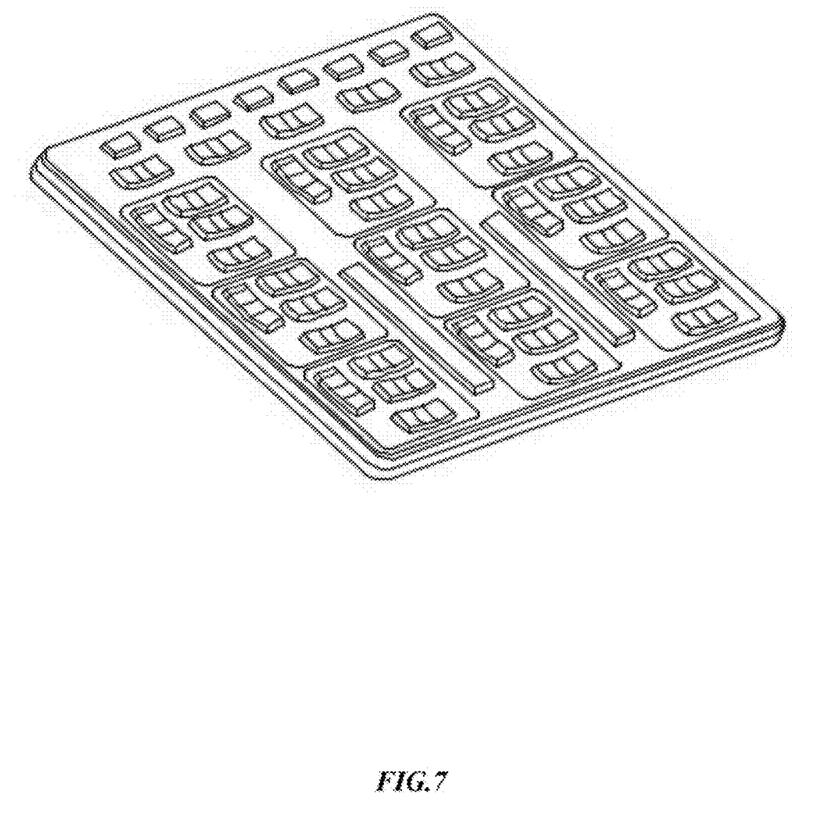
FIG. 7 is a representation of the Brahmi phonemics based Keyboard, in accordance with the present disclosure.
Figure 8:
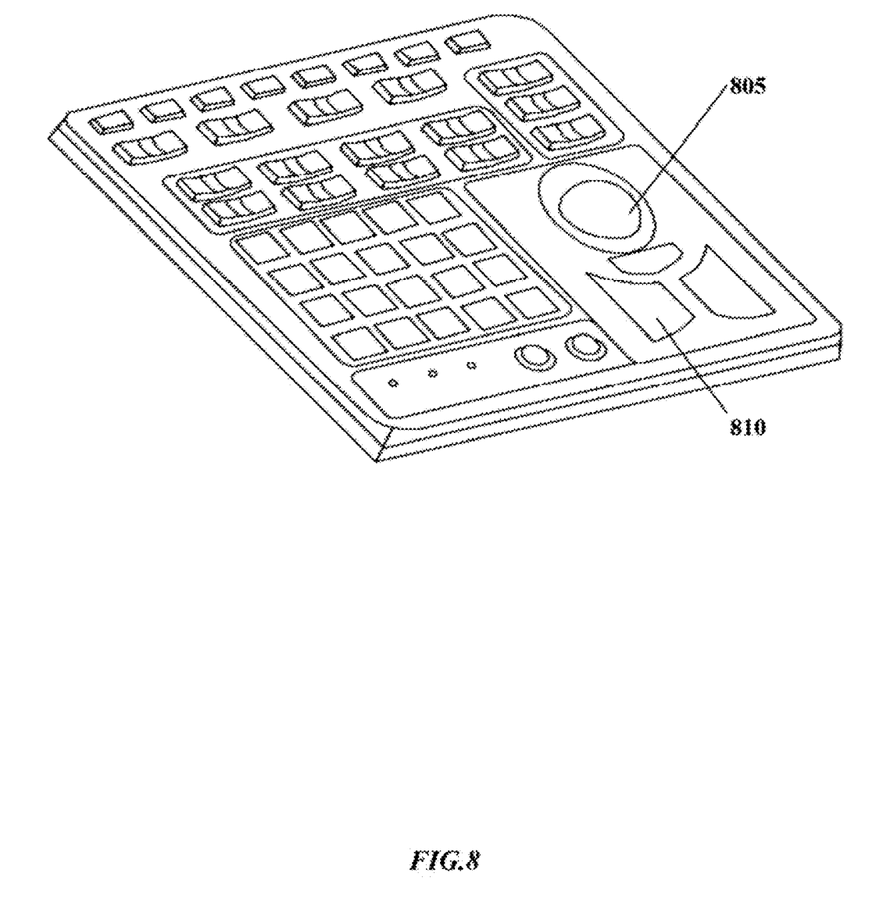
FIG. 8 is a representation of the Brahmi phonemics based keyboard comprising a touch pad and a pointing device.
Figure 9:
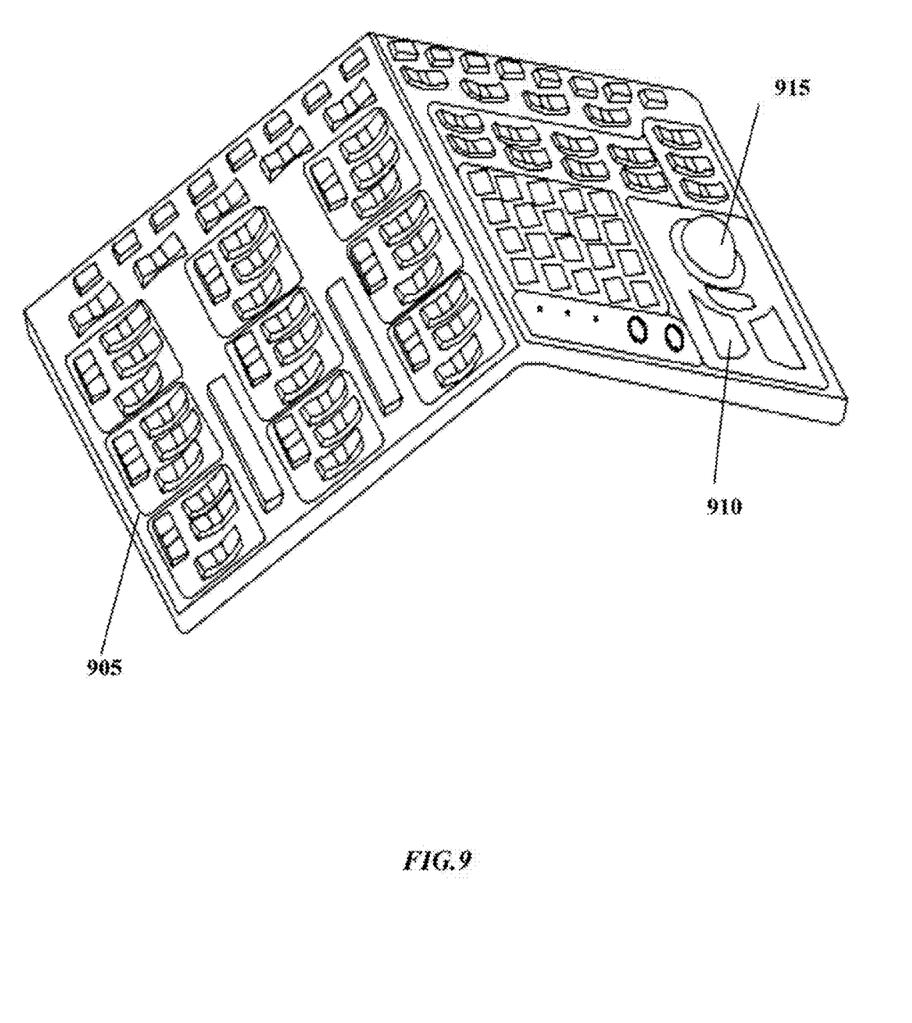
FIG. 9 is a representation of the Brahmi phonemics based keyboard having a foldable structure.

Referring to FIG. 7, there is shown a schematic representation of the Brahmi phonemics based Keyboard, in accordance with the present disclosure. FIG. 8 illustrates the Brahmi phonemics based keyboard comprising a touch pad 805 and a pointing device 810. FIG. 9 illustrates the Brahmi phonemics based keyboard having a foldable structure. The foldable structure combines the input key clusters 905, the touch pad 910 and the pointing device 915 into an integrated unit that can be laid out to represent all the keys or be folded so that only the left side or the right side can be on the top for compactness.

Figure 10:
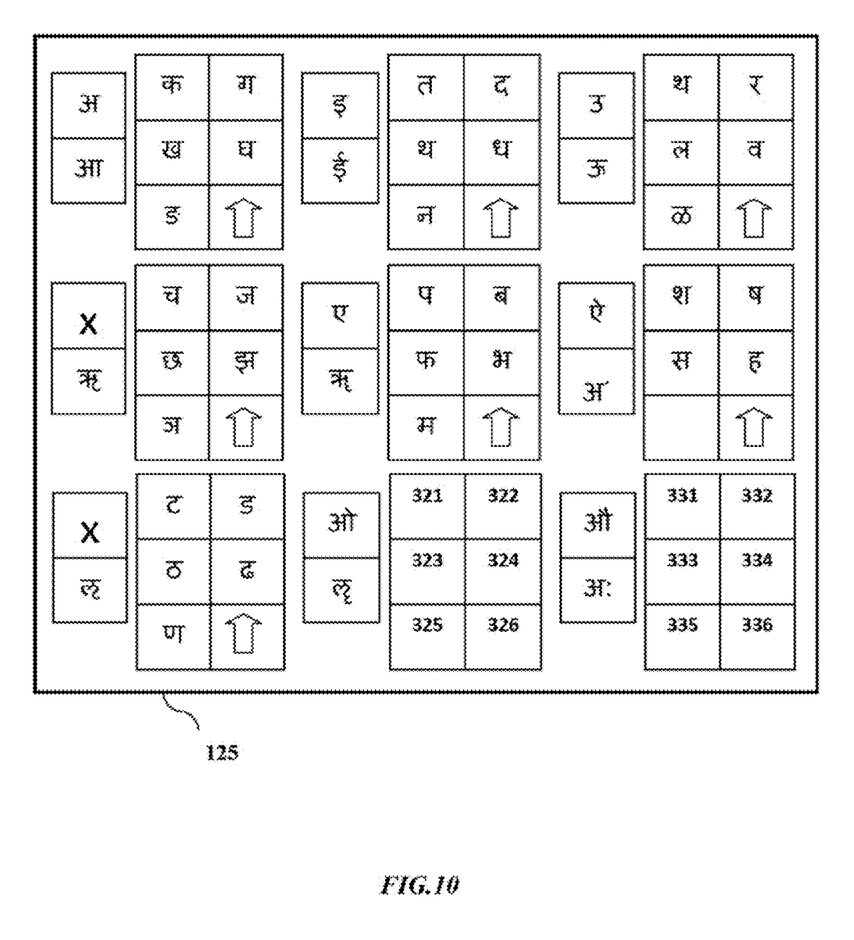
FIG 10 is a block diagram illustrating the layout of the character input keys arranged for providing textual inputs in Sanskrit language.
Figure 11:
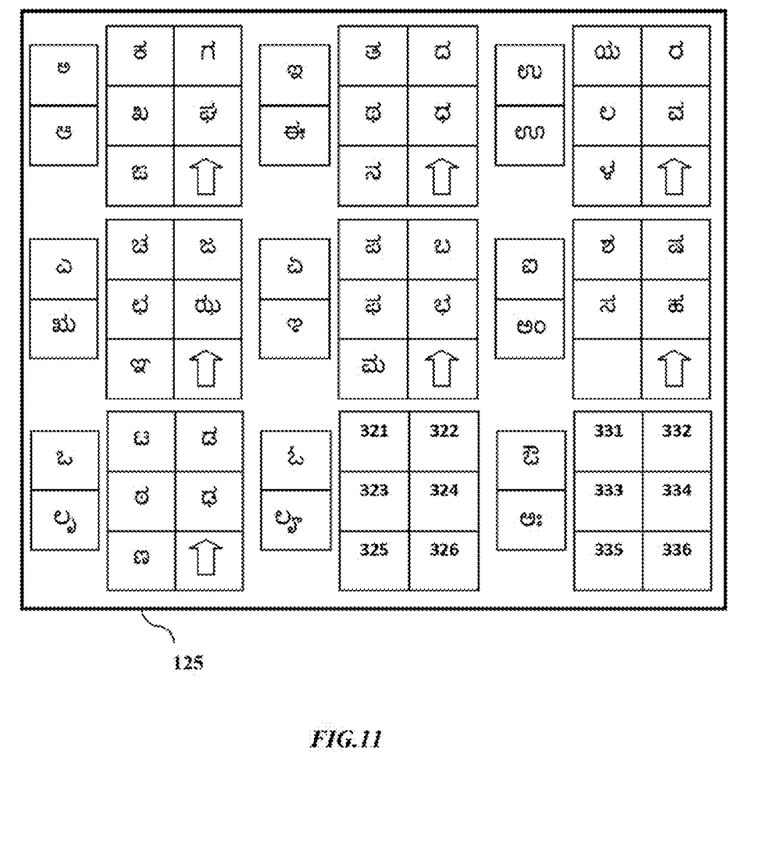
FIG. 11 is a block diagram illustrating the layout of the character input keys arranged for providing textual inputs in Sanskrit language.

Referring to FIG. 10 and FIG. 11, there is shown a view of the clusters 125 of the keyboard layout 100. FIG. 10 illustrates the clusters as having the alphabets corresponding to Sanskrit script. FIG. 11 illustrates the clusters as having the alphabets corresponding to Kannada script. As shown in FIG. 10 and FIG. 11, each of the clusters incorporates a 'Shift' modifier key marked by an 'Upward Arrow'. The 'Shift' modifier key is utilized to combine the vowels/consonants with other consonants. In accordance with the present disclosure, when the 'Shift' modifier key (as shown in FIG. 10 and FIG. 11) is pressed subsequent to a vowel/consonant being Input, the 'Shift' modifier key press is considered as an instruction to combine the previously input vowel/consonant, with another consonant. Further, in FIG. 10 and FIG. 11, the input keys marked 321-326 and 331-336 are reserved for format related commands and special functions (for example, voice based input, transliteration, zoom in/zoom out printer command) respectively. Further, in FIG. 10 and FIG. 11, the inputs keys marked 'X' are reserved future use.

The technical advantages of the system and method envisaged by the present disclosure include providing a keyboard layout that enables a user to input the characters in a plurality of Indian languages. The keyboard layout envisaged by the present disclosure provides for overlaying one language element over another language element during the design of a multilingual keyboard layout. The keyboard layout envisaged by the present disclosure provides for primary and accommodative overlaying of Brahmi phonemics with English phonetics.

Further, the keyboard layout that provides for an improved solution that enables users to provide inputs in a plurality of Indian Languages, with ease.

The keyboard layout is user-friendly and can be seamlessly extended to other languages of the world, without compromising the input model for the LOI language elements. The keyboard layout comprises a plurality of clusters having keys in horizontal as well as vertical orientations. The keyboard layout envisaged by the present disclosure incorporates keys sufficient to cover the primary character set of any Indian language. The keyboard layout envisaged by the present disclosure also enables multiple models of finger movement and action, thereby reducing the stress load on user's wrist, and reducing the risks of carpal tunnel syndrome in long term keyboard users.

Further, the keyboard layout envisaged by the present disclosure can be used in any digital device that is capable of handling Unicode compliant inputs. The keyboard layout can be used to provide inputs in LOI across browser centric visual editors, E-mail applications, web pages, data capturing forms and databases, digital libraries and e-book readers. Further, the keyboard layout provides for developing programming commands in non-English languages, and in particular Indian languages. The keyboard layout's functionality is not dependent on font considerations.

Further, due to the phonetic/alphabetic nature of the keyboard, a person who knows typing in one Indian script can type in any other Indian script, using the keyboard envisaged by the present disclosure. The logical structure of the keyboard envisaged by the present disclosure allows ease in learning, while the frequency considerations allow speed in touch typing. The keyboard remains optimal both from touch-typing and sight-typing points of view, across all Indian scripts.

The keyboard envisaged by the present disclosure assists users who are not familiar with QWERTY Mapped character layouts and spelling model inputs, to input characters in an Indic language. Further, the keyboard envisaged by the present disclosure supports and encourages Indic (Brahmi) language data entry for native language users.

The keyboard layout envisaged by the present disclosure also minimizes the number of keys available for multilingual data input in Indic language and English language usage scenario. The keyboard encompasses a new keyboard layout which can accommodate the Indic language characters in their natural order.

The keyboard layout incorporates nine cells arranged as a 3×3 matrix. Each of the cells are separated for ergonomic usability. Each cell incorporates a sub-cluster of eight input keys. Each key is mapped to at least one Indic language characters following the phonemic rule corresponding to the arrangement of vowels and consonants.

The keyboard layout envisaged by the present disclosure provides a common key stroke pattern to work across several Indic languages. Further, the keyboard envisaged by the present disclosure accommodates of Non roman script Indic (Brahmi) language as a foundation layout and Roman script character layout in DWORAK model.

Thus, while the invention has been described with reference to specific embodiments and applications, the description is illustrative of the invention and is not to be construed as limiting the invention. Various modifications and applications may occur to those skilled in the art without departing from the true spirit and scope of the invention as defined by the appended claims.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention, with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

We claim:

1. A Brahmi phonemics based keyboard system for providing textual inputs in at least one Indian language, the keyboard system comprising:
    a plurality of input keys configured to provide textual inputs in at least one Indian language, the plurality of keys being grouped across a keyboard in at least nine clusters, wherein each of the at least nine clusters incorporates at least eight characters of the Indian language;
    each of the at least nine clusters further comprises:
    at least three input keys having a horizontal orientation and at least one input key having a vertical orientation and wherein the eight characters are inputted via the at least three horizontal keys and the at least one vertical key;
    wherein the at least one input keys having the vertical orientation comprises an input key corresponding to a short form vowel and an input key corresponding to an equivalent long form vowel; and
    each of the at least three input keys having the horizontal orientation comprises an input key corresponding to a soft consonant and an input key corresponding to an equivalent hard consonant ;
    the keyboard system further comprising:
    a processor for receiving user input from the plurality of input keys;
        wherein the processor is configured to:
            detect a second input on one of the at least three horizontal input keys as an instruction to combine the corresponding consonant with a vowel via an input provided to one of the at least one input keys having the vertical configuration, immediately after detecting the second input and
            detect a second input on one of the at least three horizontal keys as an instruction to combine with a second consonant to form a conjunct consonant via an input provided to one of the at least three keys having the horizontal configuration, immediately after detecting the second input or
            detecting an input to a shift modifier key and one of the at least three keys having the horizontal configuration, immediately after detecting the second input.

2. The keyboard system in claim 1, wherein the Indian language is selected from the group consisting of: Hindi, Marathi, Kannada, Sanskrit, Konkani, Tamil, Telugu, Gujarati, Punjabi, Oriya, Malayalam, Manipuri, Bengali, Bhojpuri, Kashmiri, Nepali, Nagari, Newari, Odia, Pali, Sindhi, Tula, Thai, Khmer, Burmese, Indonesian, and Malaysian.

3. The keyboard system in claim 1, wherein the input keys having the vertical orientation and the input keys having the horizontal orientation are two-throw toggle type keys and wherein each of said toggle keys map onto two characters of the Indian Language.

4. The keyboard system in claim 1, further comprising a diacritics display block, said diacritics display block configured to display a plurality of diacritic phonemic modifiers for selection, subsequent to a consonant being input via at least one of the input keys having the horizontal orientation, said keyboard system further configured to validate the consonant input by the user and the diacritic to be attached to said consonant.

5. The keyboard system in claim 1, wherein said keyboard layout further includes a language selection key, said language selection key configured to enable selection between English language and the Indian Language.

6. The keyboard system in claim 5, wherein said language selection key is further configured to enable selection between a plurality of Indian languages.

* * * * *